United States Patent
Nomura (10) Patent No.: US 8,015,875 B2
(45) Date of Patent: Sep. 13, 2011

(54) SENSOR DEVICE AND METHOD FOR FABRICATING SENSOR DEVICE

(75) Inventor: Akihiko Nomura, Miyazaki (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 554 days.

(21) Appl. No.: 12/073,199

(22) Filed: Mar. 3, 2008

(65) Prior Publication Data

US 2008/0216574 A1    Sep. 11, 2008

(30) Foreign Application Priority Data

Mar. 8, 2007   (JP) ................................ 2007-059275

(51) Int. Cl.
*G01P 15/12* (2006.01)

(52) U.S. Cl. ................ 73/514.33; 73/514.34; 73/514.38

(58) Field of Classification Search ............... 73/514.33, 73/514.34, 514.36, 514.38
See application file for complete search history.

(56) References Cited

U.S. PATENT DOCUMENTS

| 6,293,149 | B1 * | 9/2001 | Yoshida et al. | 73/514.01 |
| 6,662,659 | B2 * | 12/2003 | Saitoh | 73/514.34 |
| 6,772,632 | B2 * | 8/2004 | Okada | 73/514.38 |
| 6,892,579 | B2 * | 5/2005 | Ohtoyo et al. | 73/514.33 |
| 7,010,976 | B2 * | 3/2006 | Ozawa et al. | 73/504.12 |
| 7,107,847 | B2 * | 9/2006 | Yoshida et al. | 73/514.33 |
| 7,331,230 | B2 * | 2/2008 | Takeyari et al. | 73/514.33 |
| 7,357,026 | B2 * | 4/2008 | Ozawa | 73/514.33 |
| 7,389,691 | B2 * | 6/2008 | Kai | 73/514.36 |

FOREIGN PATENT DOCUMENTS

JP    2005-049130    2/2005

* cited by examiner

*Primary Examiner* — Helen C. Kwok
(74) *Attorney, Agent, or Firm* — Rabin & Berdo, PC (57) ABSTRACT

The sensor device includes a dead-weight portion, a frame portion disposed so as to surround the dead-weight portion, a supporting portion provided at the frame portion via a first insulating layer, a mass portion provided at the dead-weight portion via a second insulating layer, a beam portion connecting the supporting and mass portions, a first concave portion, and a second concave portion, wherein a depth of the first or second concave portion is from 3.3% or more to 5.0% or less of the width of the frame portion.

4 Claims, 10 Drawing Sheets

SENSOR DEVICE AND METHOD FOR FABRICATING SENSOR DEVICE

CROSS-REFERENCE TO RELATED APPLICATION

This application claims priority under 35 USC 119 from Japanese Patent Application No. 2007-059275, the disclosure of which is incorporated by reference herein.

BACKGROUND OF THE INVENTION

1. Field of the Invention

The present invention relates to a sensor device and to a method for fabricating the sensor device and more specifically to a sensor device in which insulating layers are provided between a frame and a beam, and between a dead-weight and the beam, and to a method for fabricating the sensor device.

2. Description of Related Art

MEMS (Micro Electro Mechanical Systems) are functional parts in which mechanical elements are combined with electrical elements. There is a piezoresistance-type acceleration sensor as one example of the MEMS (see Japanese Patent Application Laid-Open No. 2005-49130 for example).

Figure 9:
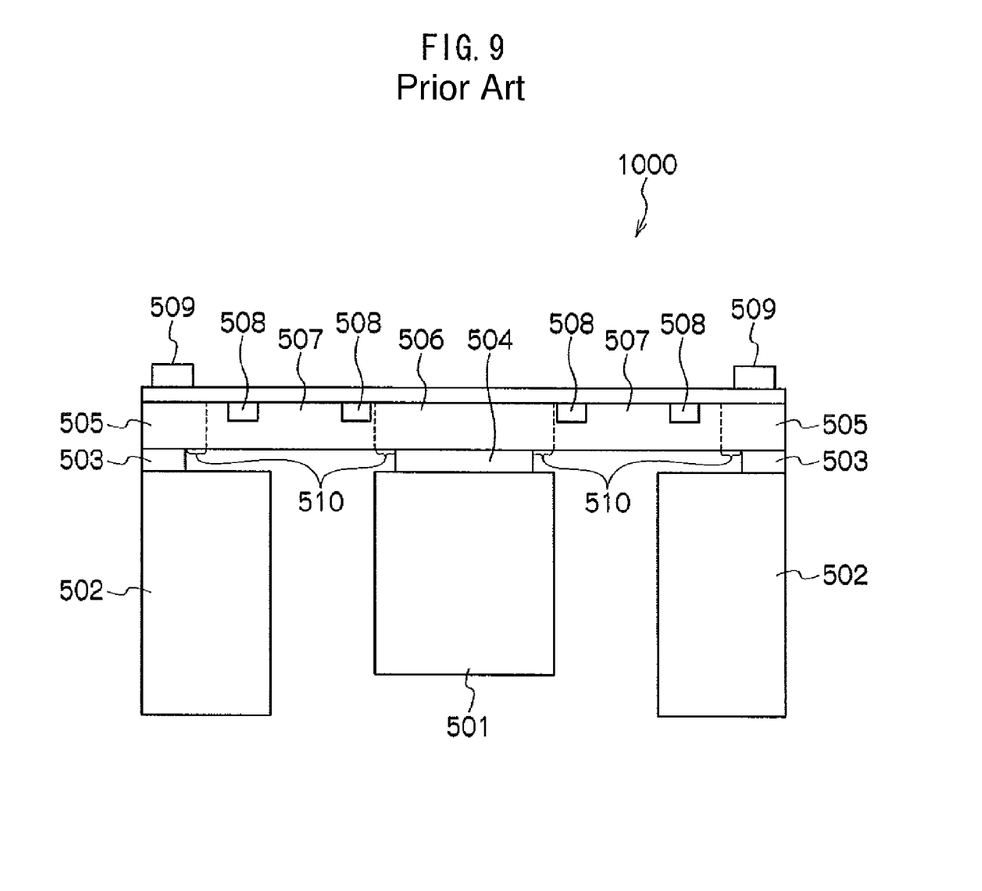
FIG. 9 is a section view of a prior art acceleration sensor.

FIG. 9 is substantially a section view of a piezoresistance-type acceleration sensor. When force caused by acceleration is applied to a dead-weight portion 501 of the sensor structure 1000, a beam portion 507 connected with supporting portions 505 and a mass portion 506 deflects, and a resistance value of a piezoresistance element 508 assembled in the beam portion 507 is changed. The changes of current or voltage caused by the changes of the resistance value are taken to the outside from an electric wire (not shown) connected to the piezoresistance via a metal pad 509 formed on an upper face of the supporting portion 505. It becomes possible to detect the acceleration by detecting this change.

Furthermore, the supporting portion 505 is provided at the frame portion 502 via an insulating layer 503 made of an oxide film and the mass portion 506 is provided at the dead-weight portion 501 via an insulating layer 504 made of an oxide film.

However, although there is a step of etching an under part of the beam portion 507 to form the beam portion 507 in fabricating the piezoresistance acceleration sensor having the structure described above, there has been no thought of etching edges of the bottom faces of the supporting portion 505 and the mass portion 506 to relax concentration of stress applied to the edges of the beam portion 507. The edges of the bottom faces of the supporting portion 505 and the mass portion 506 are slightly etched accidentally in finally made products. A space 510 between the side face of the supporting portion 505 and the side face of the insulating layer 503, i.e., the part slightly etched, is very narrow. Therefore, it is almost the same thing to support the beam portion 507 by a side of the edge of the upper face of the insulating layer 503 and a side of the edge of the upper face of the insulating layer 504. Accordingly, there has been a problem that when a sudden impact is applied, the stress concentrates on a boundary part between the supporting portion 505 and the beam portion 507 and on a boundary part between the mass portion 506 and the beam portion 507, easily damaging the beam portion 507 by the impact.

In order to avoid such problem, the improvement of the impact resistance has been made by adjusting the width, thickness and others of the beam portion in the past.

However, it has been difficult to achieve the both micronization and improvement of the impact resistance because the impact resistance deteriorates if a width of the frame is reduced along the reduction of the acceleration sensor, a width of the beam is reduced along that or a thickness of the beam is reduced for the purpose of enhancing its sensitivity.

SUMMARY OF THE INVENTION

The present invention has been made to achieve the following object in view of the problems described above.

That is, the object of the invention is to provide a sensor device, and a fabrication method of the sane, that has a favorable impact resistance and that can be micronized.

As a result of ardent study, the inventors achieved the aforementioned object by finding that the use of a sensor device and a method for fabricating the same described below allows the aforementioned problems to be solved.

That is, a sensor device of a first mode of the invention includes;

a dead-weight portion and a frame portion disposed so as to surround the dead-weight portion;

a supporting portion provided at the frame portion via a first insulating layer;

a mass portion provided at the dead-weight portion via a second insulating layer;

a beam portion connecting the supporting portion and the mass portion;

a first concave portion partitioned by a face of the supporting portion facing an upper face of the frame portion, a face of the frame portion facing a bottom face of the supporting portion and a side face of the first insulating layer at the side of the dead-weight portion; and a second concave portion partitioned by a face of the mass portion facing an upper face of the dead-weight portion, a face of the dead-weight portion facing a bottom face of the mass portion and a side face of the second insulating layer at a side of the frame portion, wherein a depth of the first or second concave portion is from 3.3% or more of the width of the frame portion.

The sensor device of a second mode of the invention has the first concave portion or second concave portion whose depth is 5.0% or less of the width of the frame portion.

According to the sensor device of the first and second modes of the invention, because the sensor device has the structure of supporting the beam portion by the face of the supporting portion facing the upper face of the frame portion and the face of the mass portion facing the upper face of the dead-weight portion and of receiving stress thus by the faces when the depth of the first concave portion and the depth of the second concave portion are within the range described above, the impact resistance thereof may be improved. Furthermore, because the stress applied to the beam portion is relaxed by the first and second spatial portions, its impact resistance may be improved even if the width and thickness of the beam portion are reduced.

The sensor device of a third mode of the invention has a third concave portion provided at the side face of the first insulating layer at the side of the dead-weight portion or at the side face of the second insulating layer at the side of the frame portion at a position corresponding to the beam portion.

According to the sensor device of the third mode of the invention, an area of the face having the stress relaxing effect described above may be locally widened, in addition to the effect in the first mode, so that the impact resistance may be improved by bringing about the further stress relaxing effect. Furthermore, because the insulating layer of parts having no stress relaxing effect is not etched and areas where the insulating layers contact with the frame portion and the supporting portion are large, strength of the sensor device itself may be maintained.

The sensor device of a fourth mode of the invention further includes chamfered portions forming an angle of 40 to 60 degrees with the upper faces of the frame portion and of the dead-weight portion at an edge of the upper face of the frame portion at the side of the dead-weight portion and at an edge of the upper face of the dead-weight portion.

The sensor device of the fourth mode of the invention can also improve the impact resistance because it can avoid an impact applied to the frame and dead-weight portions and suppress sticking even when the beam portion suddenly changes and its displacement is large by having the predetermined chamfered portions having the range of angle described above in addition to the effect of the first mode.

A method for fabricating the sensor device of a fifth mode of the invention includes: a step of providing an insulating layer and a second substrate on a first substrate;

a step of providing a groove on a bottom face of the first substrate and of forming a frame portion and a dead-weight portion;

a step of exposing the insulating layer between the frame portion the dead-weight portion and of etching the bottom face of the dead-weight portion;

a step of removing the exposed portion of the insulating layer by means of dry etching; and a step of forming a first concave portion partitioned by a face of the supporting portion facing the upper face of the frame portion, a face of the frame portion facing the bottom face of the supporting portion and a side of the first insulating layer at the side of the dead-weight portion and a second concave portion partitioned by a face of the mass portion facing the upper face of the dead-weight portion, a face of the dead-weight portion facing the bottom face of the mass portion and a side of the second insulating layer at the side of the frame portion and of wet-etching so that depth of the first and second concave portions is from 3.3% or more to 5.0% or less of the width of the frame portion.

According to the method for fabricating the sensor device of the fifth mode of the invention, the first and second concave portions may be readily formed by using wet-etching in forming the first and second concave portions.

As described above, the invention can provide the sensor device, and the fabrication method thereof, that has the favorable impact resistance and that can be micronized.

BRIEF DESCRIPTION OF THE DRAWINGS

Preferred exemplary embodiments of the present invention will be described in detail below based on the following figures, wherein.

DETAILED DESCRIPTION OF THE INVENTION

Embodiments of the present invention will be explained below with reference to the drawings. It is noted that the drawings merely show the shape, size and positional relationship of each component schematically to a degree of giving understanding of the invention and the invention is not specifically defined by them. Although specific materials, conditions and numerical conditions may be used in the explanation below, they are only one preferable example and the invention is not limited by them at all.

It is noted that a semiconductor device of the invention may be formed by using prior art or publicly known materials such as a SOI substrate. Therefore, a detailed explanation of those materials may be omitted here. The sensor device and the fabrication method of the same of the invention will now be explained along the drawings.

<Sensor Device>
[Structure of First Mode]

Figure 1A:
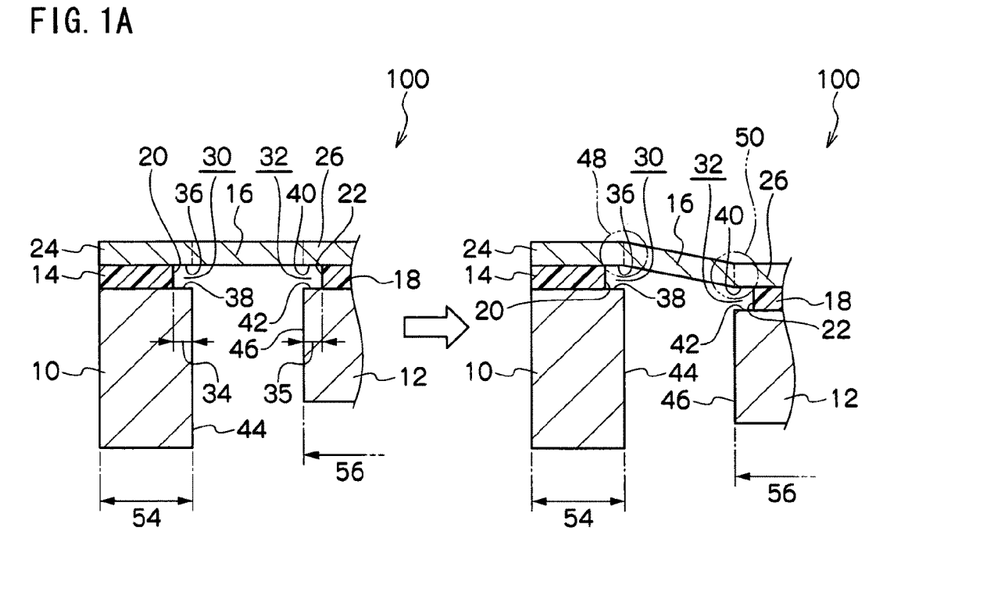
FIG. 1A is a partial section view of a longitudinal sensor structure 100 in which weight is applied to a dead-weight section in the sensor structure (first mode) of a sensor device of the invention.
Figure 1B:
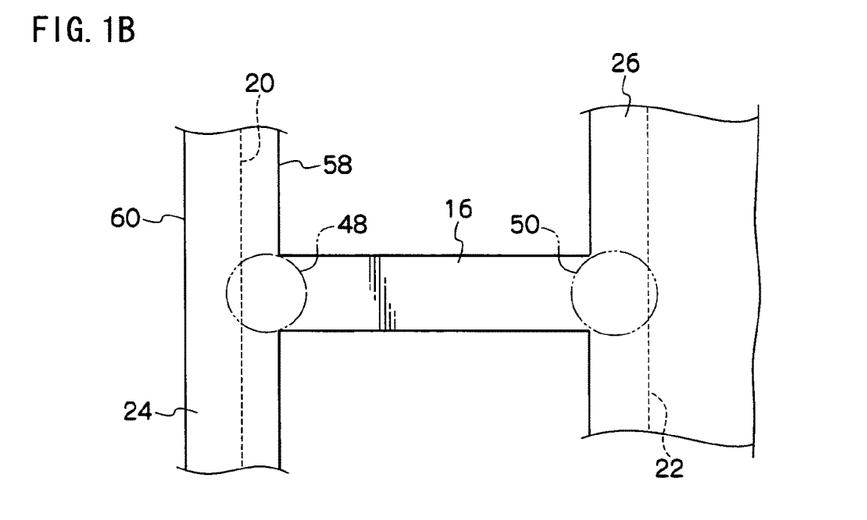
FIG. 1B is a partial upper plan view around a supporting section of the sensor structure 100 in the sensor device of the invention.

FIG. 1A is a partial section view of a longitudinal sensor structure 100 (first mode) in which weight is applied to a dead-weight section in a sensor device of the invention and FIG. 1B is a partial upper plan view around a supporting section of the sensor structure 100 in the sensor device of the invention.

The sensor structure 100 of the invention is composed of a frame portion 10, a dead-weight portion 12, a first insulating layer 14, a second insulating layer 18, a supporting portion 24, a mass portion 26, a beam portion 16, a first concave portion 30 and a second concave portion 32.

Specifically, as shown in a left part of FIG. 1A, the sensor structure 100 is composed of the dead-weight portion 12, the frame portion 10 disposed so as to surround the dead-weight portion 12, the supporting portion 24 provided at the frame portion 10 via the first insulating layer 14, the mass portion 26 provided at the dead-weight portion 12 via the second insulating layer 18, the beam portion 16 connecting the supporting portion 24 and the mass portion 26, the first concave portion 30 partitioned by a surface 36 of the supporting portion 24 facing an upper face of the frame portion 10, a face 38 of the frame portion 10 facing a bottom face of the supporting portion 24 and a side face 20 of the first insulating layer 14 at the side of the dead-weight portion 12, and the second concave portion 32 partitioned by a face 40 of the mass portion 26 facing an upper face of the dead-weight portion 12, a face 42 of the dead-weight portion 12 facing a bottom face of the mass portion 26 and a side face 22 of the second insulating layer 18 at the side of the frame portion 10.

When a load is applied to the dead-weight portion 12 in the sensor structure 100 of the invention, the beam portion 16 deflects as shown in a right part of FIG. 1A and stress concentrates around a boundary 48 between the beam portion 16 and the supporting portion 24 and around a boundary 50 between the beam portion 16 and the mass portion 26.

Furthermore, although the stress concentrates around the boundary 48 between the supporting portion 24 and the beam portion 16 as shown in FIG. 1B, the sensor structure 100 of the invention has the structure excellent in impact resistance because the face 36 of the supporting portion 24 facing the upper face of the frame portion 10 partitioned by the inner peripheral face 58 of the supporting portion 24 and the side face 20 of the first insulating layer 14 at the side of the dead-weight portion 12 relaxes the stress. This is because the side face 20 of the first insulating layer 14 at the side of the dead-weight portion 12 is located on the side of an outer peripheral face 60 of the supporting portion 24 from an inner peripheral face 58 thereof.

A depth 34 of a first concave portion 30 of the sensor structure 100 of the invention is preferable to be 3.3% or more of the width 54 of the frame portion 10 and is specifically preferable to be from 4.0% or more to 5.0% or less. Specifically, when the width 54 of the frame portion 10 is 297 µm, the depth 34 of the first concave portion 30 is preferable to be 10 µm or more, or more than 10 µm and less than 15 µm and more preferable to be more than 11.8 µm and less than 15 µm. When the depth 34 of the first concave portion 30 is 3.3% or less of the width 54 of the frame portion 10, areas of the face 36 of the mass portion 26 facing the upper face of the frame portion 10 of the supporting portion 24 and of the face 40 of the mass portion 26 facing the upper face of the dead-weight portion 12 having an effect of relaxing the concentration of stress become small to fully relax the stress, deteriorating the impact resistance. Still more, when the depth 34 of the first concave portion 30 is 5.0% or more of the width 54 of the frame portion 10, a temperature characteristic of the sensor device (the side of low temperature in particular) deteriorates and strength of the first insulating layer 14 deteriorates even though the impact resistance is maintained.

Furthermore, the depth 35 of the second concave portion 32 of the sensor structure 100 of the invention is preferable to be 3.3% or more of the width 54 of the frame portion 10 and is specifically preferable to be from 4.0% or more to 5.0% or less. Specifically, when the width 54 of the frame portion 10 is 297 µm, the depth 34 of the first concave portion 30 is preferable to be 10 µm or more, or more than 10 µm and less than 15 µm and more preferable to be more than 11.8 µm and less than 15 µm. When the depth 35 of the first concave portion 30 is 3.3% or less of the width 54 of the frame portion 10, the impact resistance deteriorates and when it is 5.0% or more of the width 54 of the frame portion 10, the temperature characteristics of the sensor device (the side of low temperature in particular) deteriorates and strength of the second insulating layer 18 deteriorates.

A specifically preferable mode among them is a case when the depth 34 of the first concave portion 30 and the depth 35 of the second concave portion 32 are from 3.3% or more to 5.0% or less of the width 54 of the frame portion 10 and the depth 34 of the first concave portion 30 and the depth 35 of the second concave portion 32 are the same. This structure has an excellent impact resistance because it can relax the stress symmetrically on the right and left regardless how weight is applied.

[Structure of Second Mode]

Figure 2:
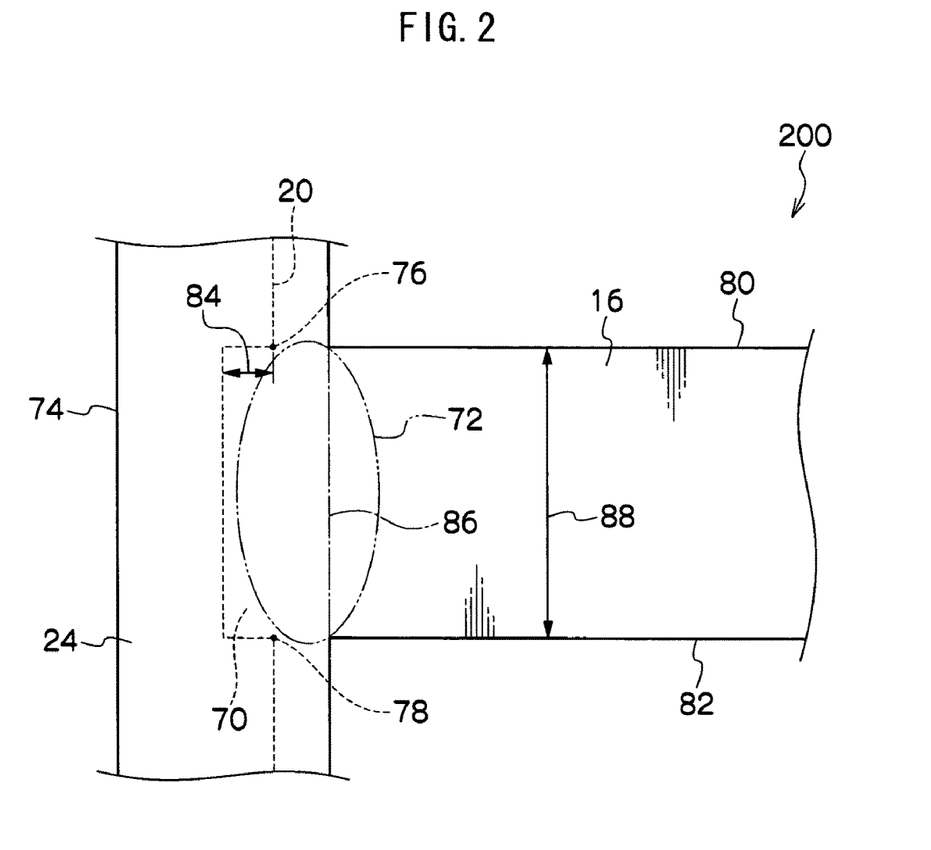
FIG. 2 is a partial upper plan view around the supporting section of the sensor structure (second mode) in the sensor device of the invention.

As a more preferable mode (second mode) of the sensor device of the invention, the sensor structure 100 has a third concave portion 70 at such position corresponding to the beam portion 16 at the side face 20 of the first insulating layer 14 at the side of the dead-weight portion 12 or at the side face 22 of the second insulating layer 18 at the side of the frame portion 10 as shown in FIG. 2.

Here, "such position corresponding to the beam portion 16" means a spot where the stress is concentrated most when the stress is applied to the beam portion 16. Specifically, it means to have such concave portion 70 that has an opening between contact points 76 and 78 where sides 80 and 82 of the beam portion 16 contact with the side face 20 when they are extended in the direction of an outer peripheral face 74 of the supporting portion 24 and has a depth 84 of the concave portion in the longitudinal direction of the beam portion 16.

A distance between the contact 76 and the contact point 78 is preferable to be equal or longer than a width 88 of the beam portion 16 and less than twice of the width 88 of the beam portion 16 from a point of view of fully relaxing the stress applied to the beam portion 16.

The depth 84 of the concave portion is not specifically limited as long as a depth from a boundary face 86 between the supporting portion 24 and the beam portion 16 to a bottom face of the third concave portion 70 is within the same range of the depth 34 of the first concave portion 30 described above.

Although a shape of the third concave portion 70 described in FIG. 2 is rectangular, it is not limited to that, any triangular or arc may be possible.

[Third Mode]

Figure 3A:
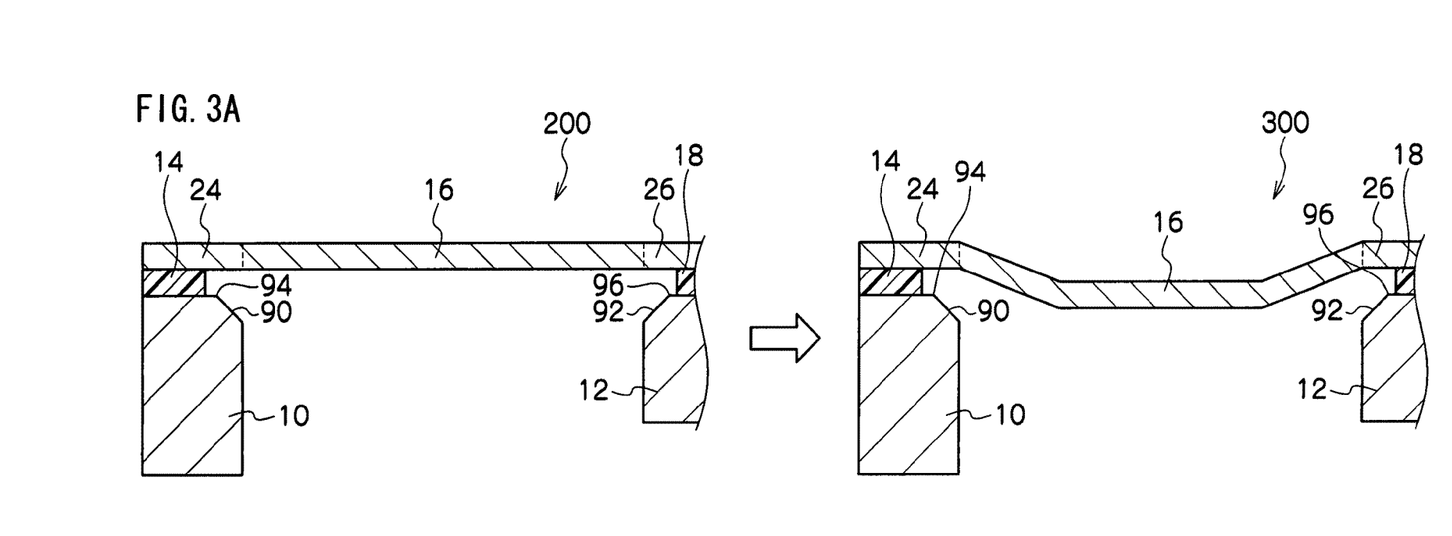
FIG. 3A is a partial upper plan view around the supporting section in the sensor structure (third mode) in the sensor device of the invention.
Figure 3B:
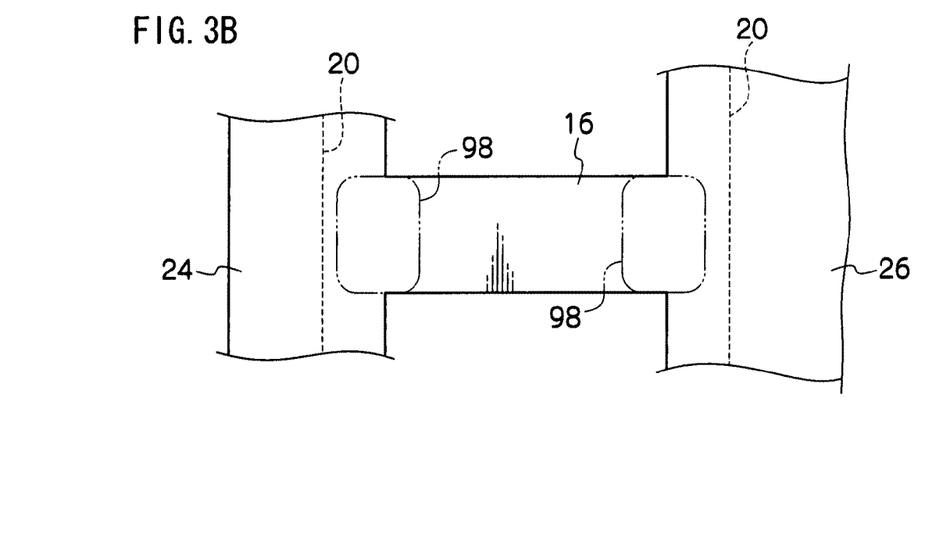
FIG. 3B is a partial upper plan view around the supporting section in the sensor structure (third mode) in the sensor device of the invention.

As a specifically preferable mode (third mode) of the sensor device of the invention, the sensor structure 100 has chamfered portions 90 and 92 forming an angle of 40 to 60 degrees with the upper face of the frame portion 10 and the upper face of the dead-weight portion 12 at an edge of the upper face of the frame portion 10 at the side of the dead-weight portion 12 and at an edge of the upper face of the dead-weight portion 12 as shown in FIGS. 3A and 3B.

Here, the chamfered portions 90 and 92 represent an angle X formed between the upper faces of the frame portion 10 and the dead-weight portion 12 and the chamfered portions 90 and 92.

<Method for Fabricating Sensor Device>

The method for fabricating the sensor device includes a step of providing an insulating layer and a second substrate on a first substrate (referred to appropriately as a "first step" hereinafter), a step of providing a groove on a bottom face of the first substrate and of forming a frame portion and a dead-weight portion (referred to appropriately as a "second step" hereinafter), a step of exposing the insulating layer between the frame portion the dead-weight portion and of etching the bottom face of the dead-weight portion (referred to appropriately as a "third step" hereinafter), a step of removing the exposed portion of the insulating layer by means of dry etching (referred to appropriately as a "fourth step" hereinafter), and a step of forming a first concave portion partitioned by a face of the supporting portion facing the upper face of the frame portion, a face of the frame portion facing the bottom face of the supporting portion and a side of the first insulating layer at the side of the dead-weight portion and a second concave portion partitioned by a face of the mass portion facing the upper face of the dead-weight portion, a face of the dead-weight portion facing the bottom face of the mass portion and a side of the second insulating layer at the side of the frame portion, and of wet-etching so that depth of the first and second concave portions is from 3.3% or more to 5.0% or less of the width of the frame portion (referred to appropriately as a "fifth step" hereinafter).

This will be explained below in detail by using FIGS. 4A through 4F.

[First Step]

Figure 4A:
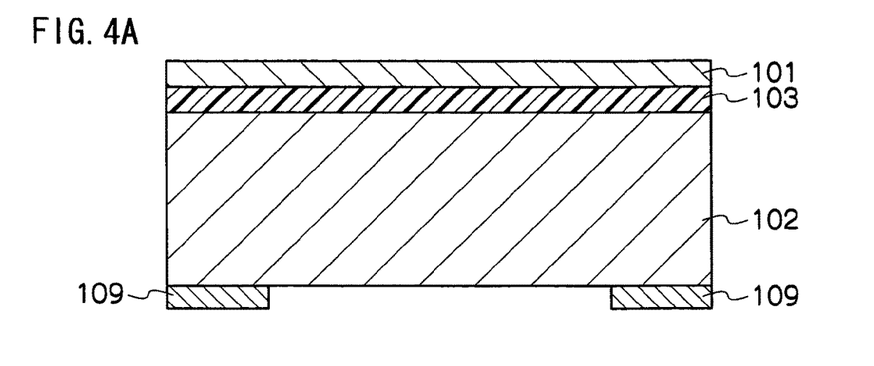
FIG. 4A is a sectional flow diagram of the sensor structure (first mode) in the sensor device of the invention.

As shown in FIG. 4A, a SOI substrate composed of a first semiconductor substrate 101, a second semiconductor substrate 102 and a insulating film 103 is prepared.

[Second Step]

Figure 4B:
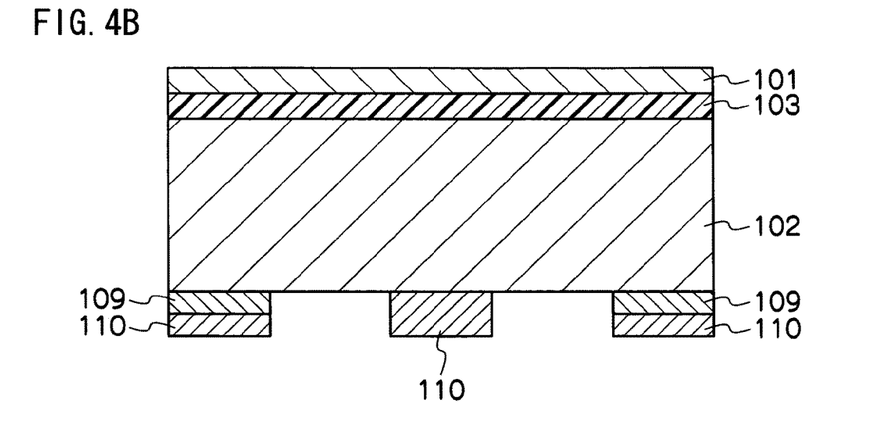
FIG. 4B is a sectional flow diagram of the sensor structure (first mode) in the sensor device of the invention.
Figure 4C:
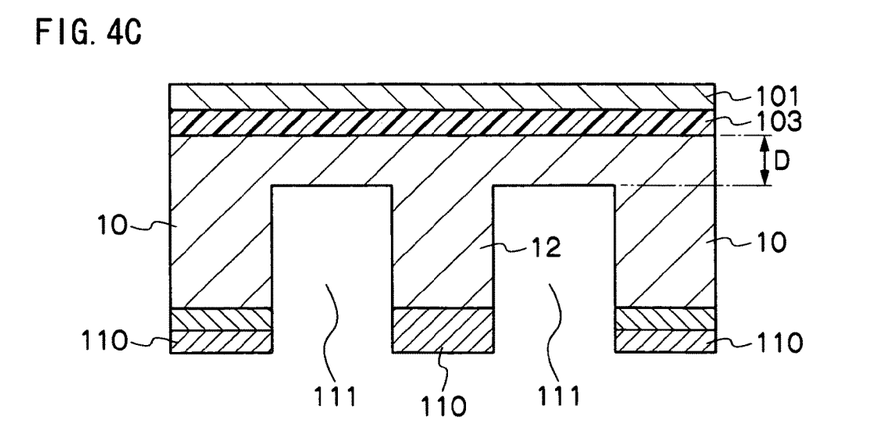
FIG. 4C is a sectional flow diagram of the sensor structure (first mode) in the sensor device of the invention.

An oxide film 109 is stacked on a surface of the second semiconductor film 102 by means of CVD and is processed so that the oxide film 109 remains at regions where the frame portion 10 is formed by means of photo-litho-etching. Then, there is formed a resist pattern that exposes regions corresponding to grooves 111 after removing the resist as shown in FIG. 4B. The dead-weight portion 12 is parted from the frame portion 10 by forming the grooves 111 by etching by means of the prior art dry-etching technology (GCET: Gas Chopping Etching Technology) by using this resist pattern 110 as shown in FIG. 4C. Here, the second semiconductor film 102 is left by a predetermined thickness D at bottom of the grooves 111.

[Third Step]

Figure 4D:
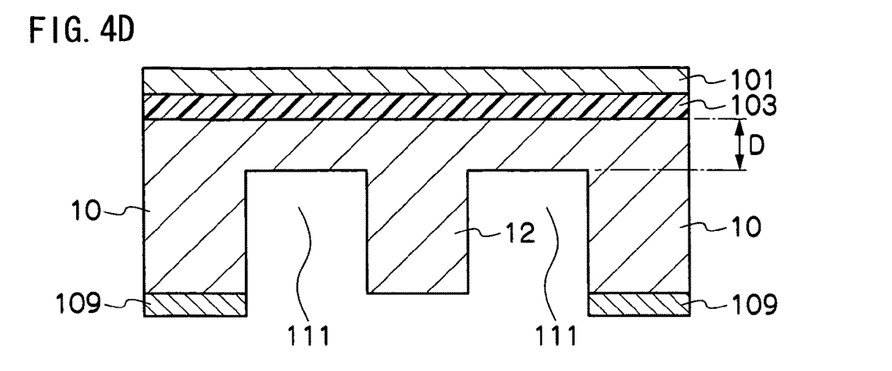
FIG. 4D is a sectional flow diagram of the sensor structure (first mode) in the sensor device of the invention.
Figure 4E:
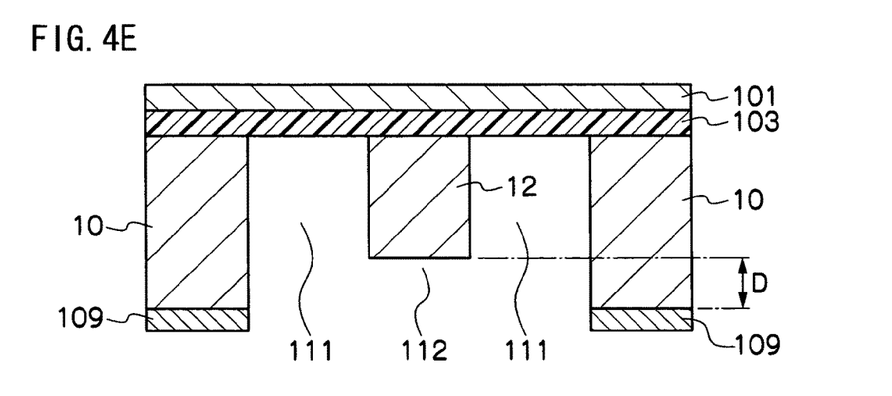
FIG. 4E is a sectional flow diagram of the sensor structure (first mode) in the sensor device of the invention.

The resist pattern 110 is removed as shown in FIG. 4D and the second semiconductor film 102 left at the bottom of the grooves 110 and the insulating film 103 is exposed by carrying out dry-etching by using the oxide film 109 as a hard mask as shown in FIG. 4E. At this time, a bottom of the dead-weight portion 12 is also etched by the predetermined thickness D, a concave portion 112 is formed on the inside of the frame portion 10 and a step of the predetermined thickness D is formed between the bottom face of the dead-weight portion 12 and the bottom face of the frame portion 10.

[Fourth Step]

Figure 4F:
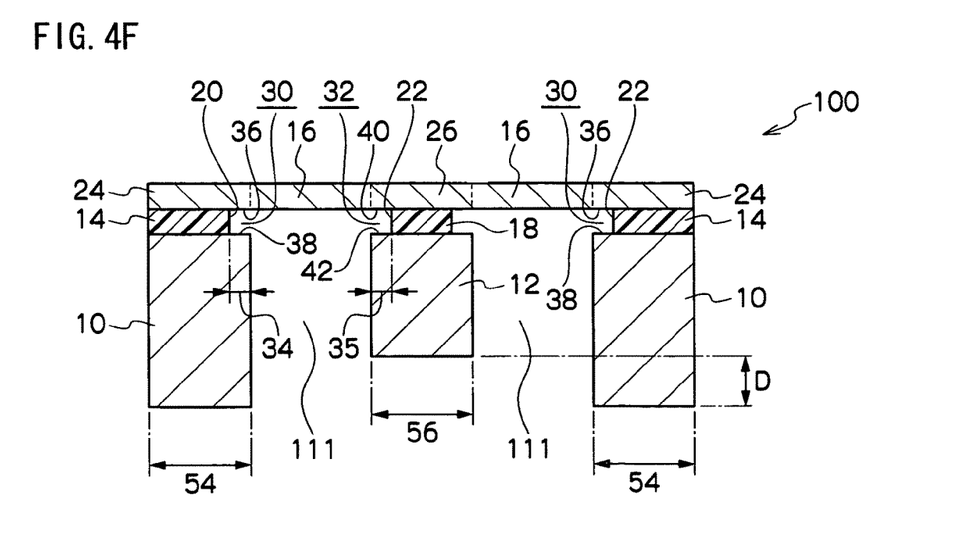
FIG. 4F is a sectional flow diagram of the sensor structure (first mode) in the sensor device of the invention.

Next, the first insulating layer 14 is formed between the frame portion 10 and the supporting portion 24 and the second insulating layer 18 is formed between the mass portion 26 and the dead-weight portion 12 by soaking the SOI substrate into a buffer hydrofluoric acid solution to remove the oxide film 109 and by etching the insulating film 103 by wet-etching as shown in FIG. 4F.

[Fifth Step]

Next, the first concave portion 30 partitioned by the face 36 of the supporting portion 24 facing the upper face of the frame portion 10, the face 38 of the frame portion 10 facing the bottom face of the supporting portion 24 and the side face 20 of the first insulating layer 14 at the side of the dead-weight portion 12 and the second concave portion 32 partitioned by the face 40 of the mass portion 26 facing the upper face of the dead-weight portion 12, the face 42 of the dead-weight portion 12 facing the bottom face of the mass portion 26 and the side face 22 of the second insulating layer 18 at the side of the frame portion 10 are formed by wet-etching the side 20 of the first insulating layer 14 and the side 22 of the second insulating layer 18. Thus, the sensor structure 100 in which the depth 34 of the first concave portion 30 and the depth 35 of the second concave portion 32 are from 3.3% or more to 5.0% or less of the width 54 of the frame portion 10 may be fabricated.

It is noted that the fourth and fifth steps are carried out continuously.

[Preferable Aspect of Fabrication Method]

The gas used in the dry-etching in the third step is $C_4F_8$, $SF_6$ or their mixed gas for example. Preferably, a treatment time is 60 to 100 minutes.

It is possible to adjust the depth 34 of the first concave portion 30 and the depth 35 of the second concave portion 32 formed in the fifth step by concentration of the wet-etching solution and the treatment time.

The etching solution used here may be hydrofluoric acid and a mixed solution of hydrofluoric acid. In particular, a mixed solution of hydrofluoric acid and ammonium fluoride is preferable. The treatment time is preferable to be 60 to 100 minutes. The treatment time of the wet-etching here is a total time of the fourth and fifth steps.

A specifically preferable mode among them is a combination of the cases when the etching solution is the mixed solution of hydrofluoric acid and ammonium fluoride and the treatment time of etching is 60 to 100 minutes.

[More Preferable Fabrication Method of Sensor Structure]

The step of providing the concave portions on the sides of the first insulating layer 14 may be changed so that the resist pattern 110 used in processing the dead-weight portion 12 in the second step is formed into the predetermined shape of the concave portion at the predetermined position.

[Specially Preferable Fabrication Method of Sensor Structure]

The chamfered portion may be formed by over-etching during the dry-etching in the third step.

The angle of the chamfered portion may be appropriately formed by the gas used in etching. For example, it becomes possible to conduct anisotropic etching by appropriately changing a mixing ratio of the mixed gas of $C_4F_8$ and $SF_6$ preferably used in the invention.

A treatment time of the over-etching is preferable to be 40 to 50% of the treatment time of the dry-etching.

The sensor device of the invention excels in the impact resistance even if sudden impact is applied to the beam portion because it can relax the stress of the beam portion by having the insulating layer between the supporting portion and the frame portion or between the mass portion and the dead-weight portion and having the concave portion provided at the predetermined position as described above. Still more, it is possible to provide the sensor device excelling in the impact resistance even if the width and thickness of the beam portion are reduced in order to accommodate to its micronization. Furthermore, the fabrication method of the sensor device of the invention makes it possible to readily fabricate such sensor device.

The sensor structure of the sensor device of the invention is applicable to sensors such as an acceleration sensor and pressure sensor and to a head of an ink-jet printer, a gyroscope, DMD (digital mirror device) and others.

EMBODIMENTS

While the invention will be specifically explained below by showing embodiments thereof, the invention is not limited to them.

Among various applications, the invention is applied to an acceleration sensor.

Figure 5:
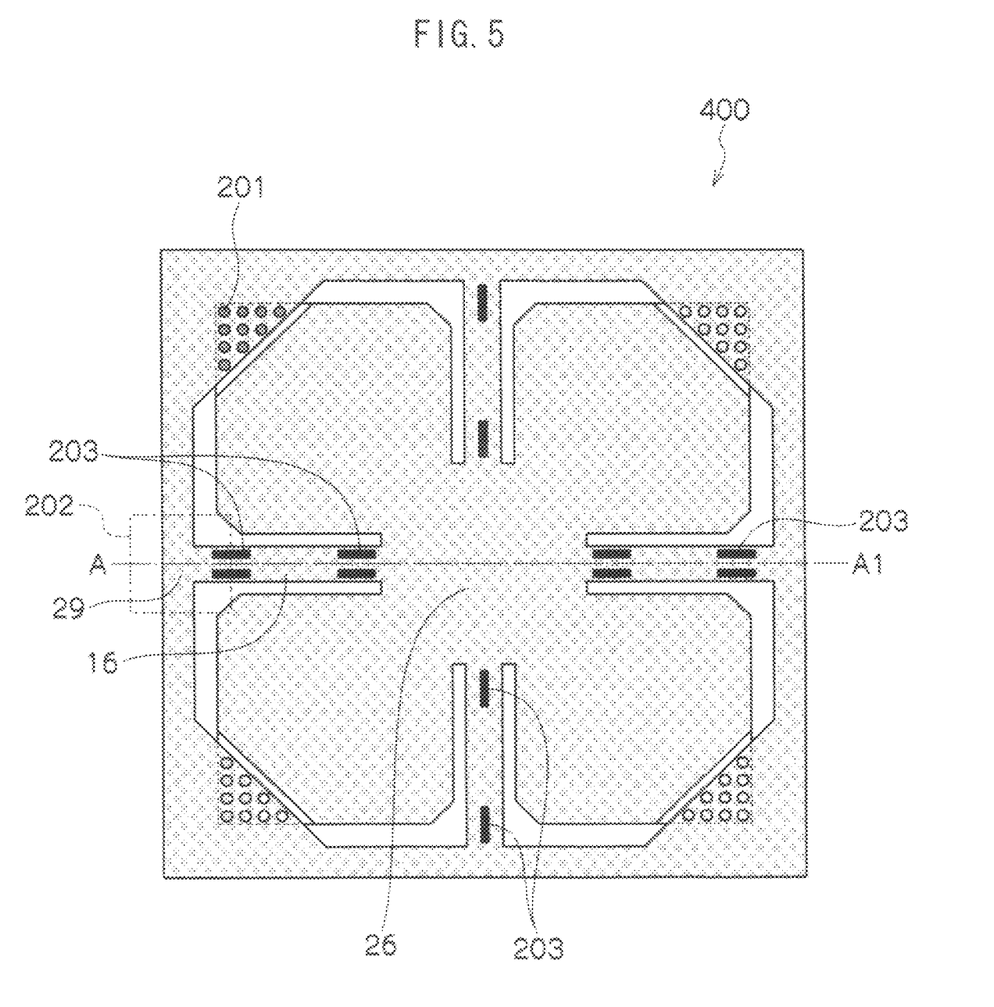
FIG. 5 is an upper plan view of the sensor device of the invention.

FIG. 5 is an upper plan view of the acceleration sensor 400 having the sensor structure of the invention. The acceleration sensor 400 shown in FIG. 5 has the mass portion 26 positioned at the center above the dead-weight portion, the supporting portion 24 formed so as to surround it and the beam portion 16 connected to the supporting portion 24 and the mass portion 26. It includes piezoresistance elements 203 around the end of the beam portion 16 and a stopper groove 201 provided around a corner of the acceleration sensor 400.

Figure 6:
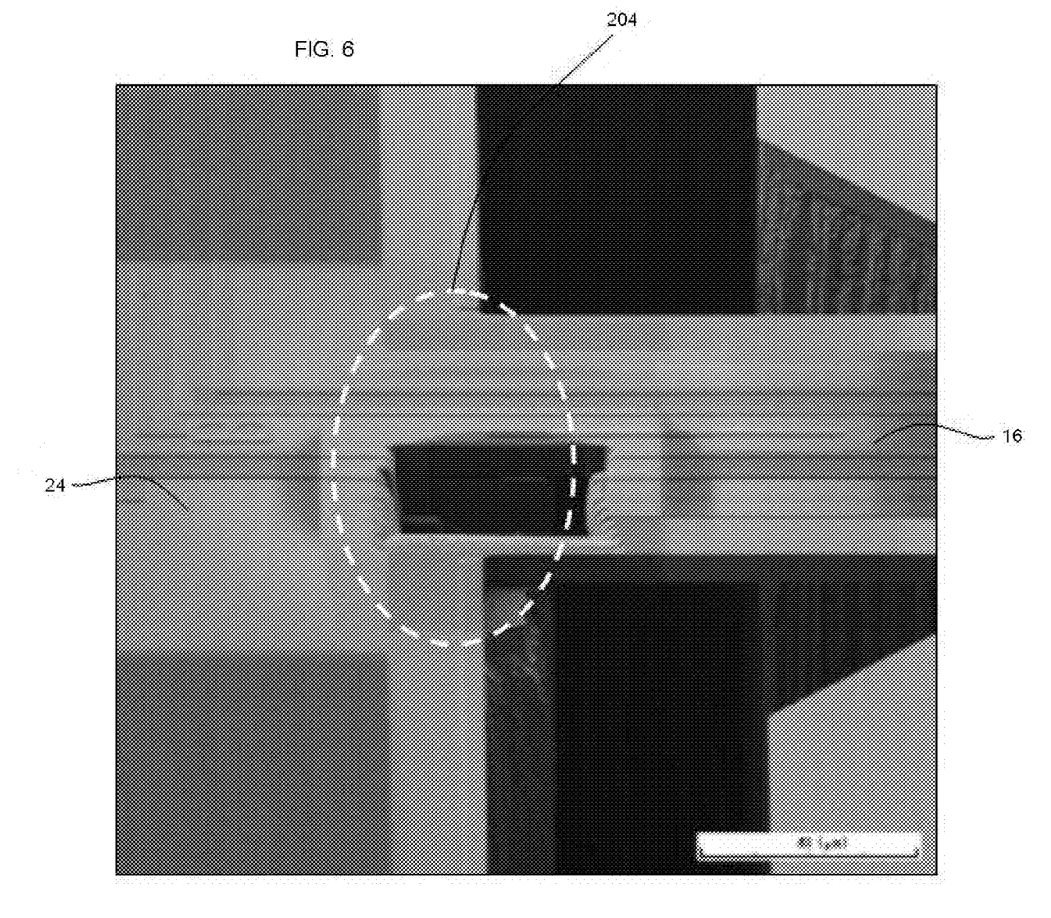
FIG. 6 is a SIM picture around a beam portion in FIG. 5.

FIG. 6 is a SIM picture of the region 202 in FIG. 5. A stress concentrating spot 204 exists around the boundary between the supporting portion 24 and the beam portion 16.

First Embodiment

Fabrication of Acceleration Sensor of First Embodiment

Figure 7:
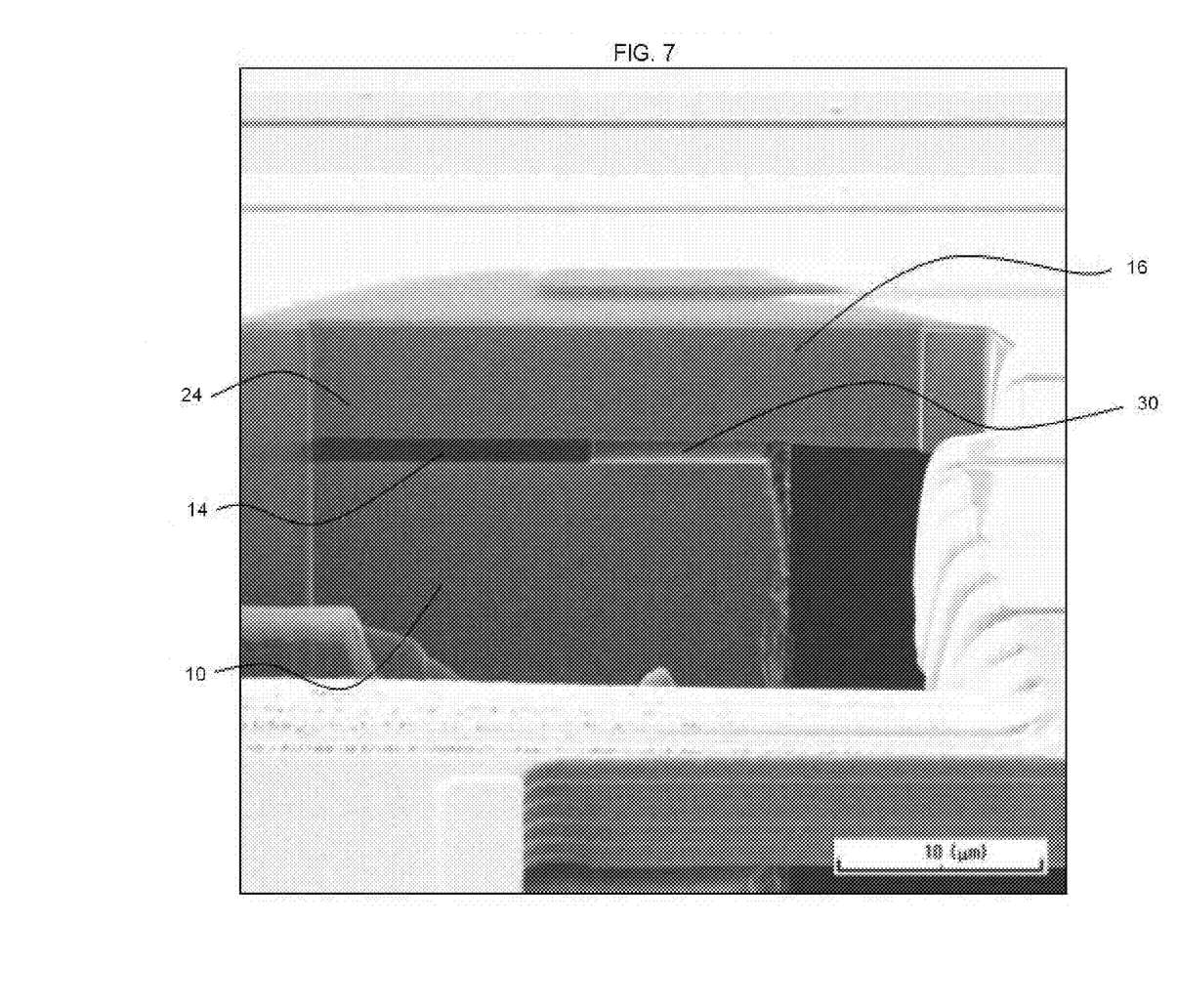
FIG. 7 is a SIM picture of a partial section of the sensor device in the first embodiment of the invention.

The fabrication steps described above were carried out under the following conditions in terms of the width of the frame portion, the depth of the concave portion, the gas of the dry-etching, the treatment time of the dry-etching, the wet-etching solution and the wet-etching treatment time;
 Width of Frame Portion: 297 μm
 Depth of Concave Portion: 10 μm
 Gas of Dry-etching: Mixed Gas of $C_4F_8$ and $SF_6$
 Treatment Time of Dry-etching: 70 minutes
 Wet-etching Solution: Mixed Solution of hydrofluoric acid and ammonium fluoride
 Treatment Time of Wet-etching: 70 minutes
[Acceleration Sensor of First Embodiment]
 FIG. 7 is a SIM picture of a partial section of the acceleration sensor fabricated as described above. The first concave portion 30 is formed by the frame portion 10, the first insulating layer 14 and the supporting portion 24. The acceleration sensor fabricated in the first embodiment has the sensor structure of the first mode described above.
[Evaluation]
—Depth of Recess with Respect to Width of Frame—
 The depth of the groove of the acceleration sensor in the first embodiment thus fabricated was taken by the prior art SIM picture and was obtained by (depth of concave portion/width of frame portion)×100.
—Breakdown Weight—
 An impact weight was measured by using a prior art air-blown impact testing apparatus. Table 1 shows its results.

Second Embodiment

The acceleration sensor was fabricated in the same manner with the first embodiment except of that the resist pattern 110 during the wet-etching in the fabrication step described above was changed into a shape that forms a rectangular concave portion. Table 1 shows its evaluation results. It is noted that the acceleration sensor fabricated in the second embodiment has the sensor structure of the second mode.

Third Embodiment

Figure 8:
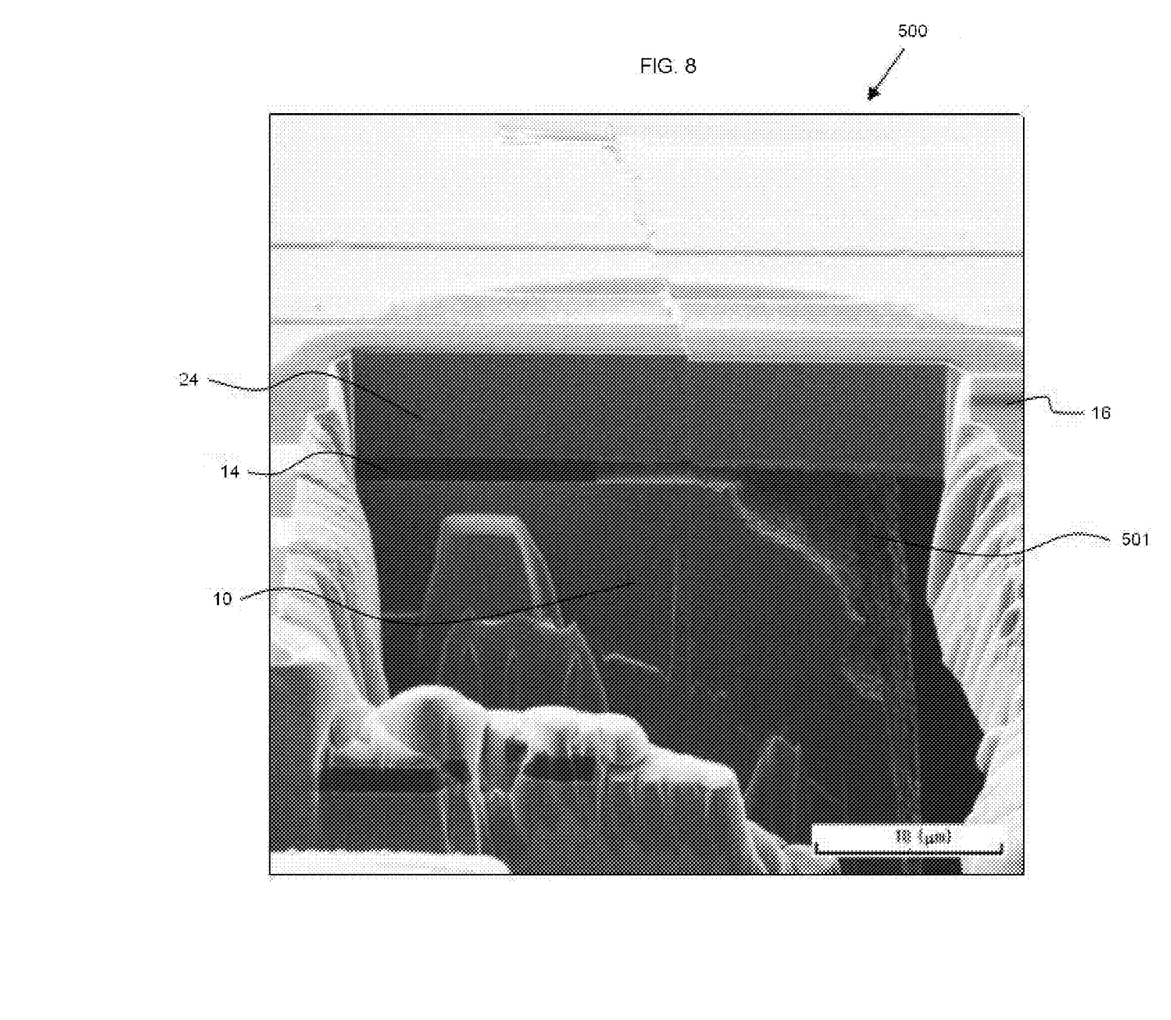
FIG. 8 is a SIM picture of a partial section of the sensor device in the third embodiment of the invention.

An acceleration sensor 500 was fabricated in the same manner with the first embodiment except of that the over-etching time during the dry-etching in the fabrication step described above was set at 35 minutes. Table 1 shows its evaluation results. FIG. 8 is a SIM picture of a partial section of the acceleration sensor fabricated as described above. It can be seen that the chamfered portion 501 is formed on the frame portion 10. An angle formed between the chamfered portion 501 and the upper face of the frame portion 10 was 50 degrees. The depth of the concave portion was 15 μm. It is noted that the acceleration sensor fabricated in the third embodiment has the sensor structure of the third mode described above.

Comparative Example

An acceleration sensor was fabricated by the same fabrication method with the prior art, i.e., the fabrication method of carrying out the first through fourth steps in the fabrication process of the first embodiment and carrying out no fifth step. Table 1 shows its evaluation results.

TABLE 1

|  | Depth of Recess with respect to Width of Frame (%) | Breakdown Weight |
|---|---|---|
| Embodiment 1 | 3.3 | 8000 G |
| Embodiment 2 | 5.0 | 9000 G |
| Embodiment 3 | 5.0 | 10000 G |
| Comparative Example | 1.6 | 5000 G |

As described above, the results excelling in the impact resistance as compared to the comparative example was obtained by the embodiments of the invention.

What is claimed is:
1. A sensor device, comprising:
 a dead-weight portion and a frame portion disposed so as to surround the dead-weight portion;
 a supporting portion provided at the frame portion via a first insulating layer;
 a mass portion provided at the dead-weight portion via a second insulating layer;
 a beam portion connecting the supporting portion and the mass portion;
 a first concave portion partitioned by a face of the supporting portion facing an upper face of the frame portion, a face of the frame portion facing a bottom face of the supporting portion, and a side face of the first insulating layer at a side of the dead-weight portion;
 a second concave portion partitioned by a face of the mass portion facing an upper face of the dead-weight portion, a face of the dead-weight portion facing a bottom face of the mass portion, and a side face of the second insulating layer at a side of the frame portion, wherein a depth of the first or second concave portion is 3.3% or more or 5.0% or less of a width of the frame portion; and
 chamfered portions forming an angle of 40 to 60 degrees with the upper face of the frame portion and the upper face of the dead-weight portion at an edge of the upper face of the frame portion at the side of the dead-weight portion and at an edge of the upper face of the dead-weight portion.
2. The sensor device according to claim 1, wherein a third concave portion is provided at the side face of the first insulating layer at the side of the dead-weight portion or at the side face of the second insulating layer at the side of the frame portion at a position corresponding to the beam portion.
3. The sensor device according to claim 1, wherein the chamfered portions contact an edge of the first or second concave portion.
4. The sensor device according to claim 1, further comprising a piezoresistance element around an end of the beam portion.

* * * * *